US008593845B2

(12) United States Patent
Manabe

(10) Patent No.: US 8,593,845 B2
(45) Date of Patent: Nov. 26, 2013

(54) CONVERTER CONTROLLER

(75) Inventor: Kota Manabe, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 124 days.

(21) Appl. No.: 13/259,280

(22) PCT Filed: Jun. 11, 2009

(86) PCT No.: PCT/JP2009/060714
§ 371 (c)(1),
(2), (4) Date: Sep. 23, 2011

(87) PCT Pub. No.: WO2010/143293
PCT Pub. Date: Dec. 16, 2010

(65) Prior Publication Data
US 2012/0026757 A1  Feb. 2, 2012

(51) Int. Cl.
*H02M 7/537* (2006.01)

(52) U.S. Cl.
USPC ........................................................ 363/131

(58) Field of Classification Search
USPC ........ 363/16, 95, 97, 131; 323/265, 271, 311; 429/428, 429; 307/9.1, 82, 84; 318/139, 521, 400.09
See application file for complete search history.

(56) References Cited

U.S. PATENT DOCUMENTS

| 6,018,469 | A | 1/2000 | Poon | |
|---|---|---|---|---|
| 7,486,036 | B2 * | 2/2009 | Oyobe et al. | 318/376 |
| 8,228,014 | B2 * | 7/2012 | Jang et al. | 318/521 |
| 8,273,490 | B2 * | 9/2012 | Umayahara et al. | 429/428 |
| 2010/0181829 | A1 * | 7/2010 | Ichikawa et al. | 307/9.1 |
| 2010/0201197 | A1 * | 8/2010 | Shires et al. | 307/73 |
| 2011/0316333 | A1 * | 12/2011 | Still | 307/9.1 |
| 2012/0032620 | A1 * | 2/2012 | Shimada et al. | 318/400.09 |
| 2012/0074919 | A1 | 3/2012 | Hasegawa et al. | |

(Continued)

FOREIGN PATENT DOCUMENTS

| DE | 69832220 T2 | 7/2006 |
|---|---|---|
| DE | 112009004843 T5 | 9/2012 |

(Continued)

OTHER PUBLICATIONS

International Search Report issued Jul. 21, 2009 of PCT/JP2009/060714.

*Primary Examiner* — Adolf Berhane
(74) *Attorney, Agent, or Firm* — Kenyon & Kenyon LLP

(57) ABSTRACT

Provided is a converter controller capable of preventing destruction of an element such as an auxiliary switch by preventing operation interference between auxiliary circuits of respective phases in a multiphase soft switching converter. A duty threshold input unit receives, as an input, an obtained acceptable duty deviation value. A duty deviation computation unit judges whether or not the duty deviation between the phases does not exceed an acceptable duty deviation value. When the duty deviation between the phases exceeds the acceptable duty deviation value, the duty deviation computation unit corrects an adjusted U-phase duty ratio, adjusted V-phase duty ratio and adjusted W-phase duty ratio under the PID control rule, and outputs the resultant duty ratios to an FC converter control circuit. On the other hand, when the duty deviation between the phases does not exceed the acceptable duty deviation value, the duty deviation computation unit does not correct the adjusted U-phase duty ratio, adjusted V-phase duty ratio and adjusted W-phase duty ratio and outputs them to the FC converter control circuit.

6 Claims, 16 Drawing Sheets

(56) References Cited

U.S. PATENT DOCUMENTS

| | | | |
|---|---|---|---|
| 2012/0086417 A1* | 4/2012 | Osada et al. | 323/271 |
| 2012/0098507 A1* | 4/2012 | Hasegawa et al. | 323/271 |
| 2012/0106204 A1* | 5/2012 | Imanishi et al. | 363/16 |
| 2012/0139522 A1* | 6/2012 | Hasegawa et al. | 323/311 |
| 2012/0155139 A1* | 6/2012 | Boeke | 363/131 |

FOREIGN PATENT DOCUMENTS

| | | |
|---|---|---|
| JP | 10-094249 A | 4/1998 |
| JP | 2005-102438 A | 4/2005 |
| JP | 2006-340476 A | 12/2006 |
| JP | 2006-340535 A | 12/2006 |
| JP | 2007-006669 A | 1/2007 |
| WO | 2006098376 A1 | 9/2006 |

\* cited by examiner

CONVERTER CONTROLLER

This is a 371 national phase application of PCT/JP2009/060714 filed 11 Jun. 2009, the contents of which are incorporated herein by reference.

TECHNICAL FIELD

The present invention relates to a converter controller that controls an output voltage of a fuel cell.

BACKGROUND ART

Regarding fuel cell systems mounted on automobiles, etc., various hybrid fuel cell systems each having, as a power source, a fuel cell and a battery, have been proposed in order to deal with a rapid change in a load that exceeds the power generation capability of the fuel cell.

In a hybrid fuel cell system, an output voltage of a fuel cell and an output voltage of a battery are controlled by a DC/DC converter. As a DC/DC converter for carrying out such a control, a DC/DC converter having a configuration in which a switching element such as a power transistor, IGBT or FET is made to perform a PWM operation for voltage conversion has been used widely. Together with reduced power consumption, reduced size and increased performance of electronic equipment, a reduced loss, increased efficiency and reduced noise of the DC/DC converter have further been demanded. In particular, reductions of a switching loss and a switching surge that are associated with the PWM operation have been demanded.

One of the techniques for reducing the above switching loss and switching surge is a soft switching technique. Here, soft switching refers to a switching method for realizing ZVS (Zero Voltage Switching) or ZCS (Zero Current Switching), the soft switching involving a low switching loss of a power semiconductor device and a low stress given to the semiconductor device. Meanwhile, a switching method for directly turning on/off a voltage/current with a switching function of a power semiconductor device is referred to as hard switching. In the descriptions below, a method in which both or one of ZVS and ZCS is realized is referred to as soft switching, whereas the other methods are referred to as hard switching.

Soft switching is realized by a general pressure increase/decrease DC/DC converter provided with, for example, an inductor, a switching element and a diode, the DC/DC converter being additionally provided with an auxiliary circuit for reducing a switching loss (the so-called soft switching converter) (see, for example, Patent Document 1).

Meanwhile, in order to realize enhanced speed, increased capacity and reduced ripple, a multiphase DC/DC converter (multiphase converter) in which a plurality of DC/DC converters are connected in parallel has been used in the related art.

Regarding such a multiphase converter, when employing a soft switching converter as a converter of each phase, this can attain the enhanced speed and increased capacity, but might lead to upsizing of the converter. In light of this problem, it can be considered that a component of an auxiliary circuit included in the soft switching converter of each phase, e.g. an auxiliary coil, can be made to serve as a common coil shared by the converters of the phases. Accordingly, downsizing of the multiphase soft switching converter can be attained.

PRIOR ART REFERENCE

Patent Document

Patent Document 1: JP2005-102438 A

SUMMARY OF THE INVENTION

Problem to be Solved by the Invention

However, in a multiphase soft switching converter, when a current for two or more phases flows to an auxiliary coil due to operation interference between the auxiliary circuits of the respective phases, the inductance characteristic of the auxiliary coil deteriorates.

The reason for the above is described below. An auxiliary coil is generally designed such that the maximum acceptable current Imax is set assuming the flow of a current for one phase (see FIG. 16); however, when a current Iu equal to or larger than the maximum acceptable current Imax (i.e., a current for two or more phases) flows to the auxiliary coil due to the operation interference between the auxiliary circuits of the phases, the inductance characteristic of the auxiliary coil deteriorates. This has caused the problem of the flow of a current equal to or larger than a rated current to a circuit element (e.g., switching element) other than the auxiliary coil included in the auxiliary circuit, leading to, in the worst case scenario, destruction of an element.

The present invention has been made in light of the above circumstances, and an object of the invention is to provide a converter controller capable of preventing destruction of an element such as an auxiliary switch by preventing operation interference between auxiliary circuits of the respective phases in a multiphase soft switching converter.

Means for Solving the Problem

In order to solve the problem described above, the present invention provides a converter controller for a multiphase soft switching converter including auxiliary circuits of respective phases, the converter controller controlling an output voltage of a fuel cell, including: a calculation unit that calculates a duty ratio of an auxiliary switch included in each of the auxiliary circuits of the phases; a deviation derivation unit that derives a duty deviation between the auxiliary switches of the phases; and a control unit that controls the duty ratio of the auxiliary switch of each phase so that the derived duty deviation does not exceed a preset threshold value, in which the auxiliary circuits of the phases include an auxiliary coil, the auxiliary coil being a common coil shared by the auxiliary circuits of all the phases.

Regarding the multiphase soft switching converter, with such a configuration, the duty deviation between the auxiliary switches of the phases is derived, and the duty ratio of the auxiliary switch of each phase is controlled so that the derived duty deviation does not exceed the preset threshold value. Accordingly, the operation interference between the auxiliary circuits of the phases is prevented, whereby the occurrence of a circuit failure (element destruction, etc.) can be prevented.

In the configuration above, it is preferable that a converter of each of the phases includes a main voltage increasing circuit and the auxiliary circuit, that the main voltage increasing circuit includes: a main coil in which one end of the ends is connected to a high-potential-side terminal of the fuel cell;

a main switch that performs switching and in which: one end of the ends is connected to the other end of the main coil; and the other end is connected to a low-potential-side terminal of the fuel cell; a first diode in which a cathode is connected to the other end of the main coil; and a smoothing capacitor provided between an anode of the first diode and the other end of the main switch, and that the auxiliary circuit includes: a first series connection including a second diode and a snubber capacitor, the first series connection being connected in parallel with the main switch and being connected to the other end of the main coil and the low-potential-side terminal of the fuel cell; and a second series connection including a third diode, the auxiliary coil and the common auxiliary switch, the second series connection being connected between a connecting part between the second diode and the snubber capacitor and the one end of the main coil.

Further, in the configuration above, it is preferable that: the converter of each phase includes a free-wheel diode for keeping, when the auxiliary switch is turned off while the auxiliary coil is being energized, a current flowing in the same direction as that during the energization; and the free-wheel diode includes an anode terminal connected to the low-potential-side terminal of the fuel cell and a cathode terminal connected to a connecting part between the auxiliary coil and the auxiliary switch.

Further, in the configuration above, it is preferable that the preset threshold value is represented by expression (10) below:

$$Dth = \frac{(Tsc/n - Tso)}{Tsc} = 1/n - Tso * f \tag{10}$$

where Dth represents the preset threshold value, f represents a drive frequency of the auxiliary switch, n represents the number of drive phases, and Tso represents an energization time period of the auxiliary coil.

Further, in the configuration above, it is preferable that the energization time period Tso of the auxiliary coil is represented by expression (11) below.

$$\begin{aligned}Tso &= t\text{mode}1 + t\text{mode}2 \\ &= \max\left(Ip - \frac{\Delta I}{2}, 0\right) \times \frac{L2id}{(VH - VL)} + \pi\sqrt{L2id * C2d} + \\ &\quad \max\left(Ip - \frac{\Delta I}{2}, 0\right) \times \frac{L2id}{VL}\end{aligned} \tag{11}$$

The present invention provides another converter controller, for controlling an output voltage of a fuel cell, for a multiphase soft switching controller including auxiliary circuits of respective phases, in which: the auxiliary circuits of the phases include an auxiliary coil, the auxiliary coil being a common coil shared by the auxiliary circuits of all the phases; and a lower-limit energization capacitance of the auxiliary coil is set to be larger than the total current value of currents that flow for the phases when an auxiliary switch of each of the phases is turned on.

Effect of the Invention

According to the present invention, in a multiphase soft switching converter, operation interference between auxiliary circuits of the respective phases is prevented, thereby preventing destruction of an element such as an auxiliary switch.

BEST MODE FOR CARRYING OUT THE INVENTION

A. Embodiment

Figure 1:
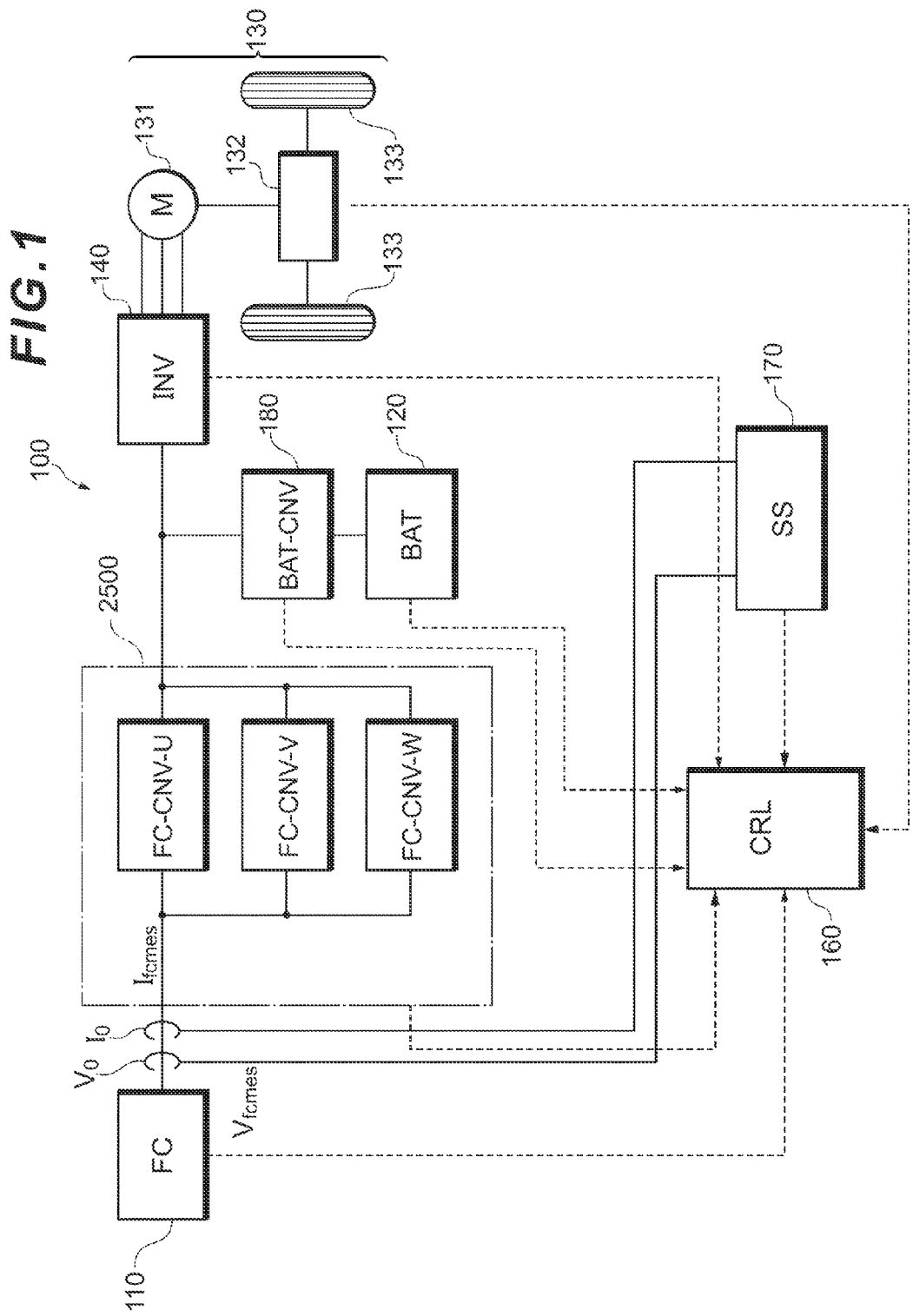
FIG. 1 is a system configuration diagram of an FCHV system according to an embodiment.

An embodiment according to the present invention will be described with reference to the drawings. FIG. 1 shows the configuration of an FCHV system mounted on a vehicle according to the embodiment. Although the following description assumes a fuel cell hybrid vehicle (FCHV) as an example of vehicles, the FCHV system may also be applied to electric vehicles, etc. In addition, the FCHV system may be applied not only to the vehicles but also to various mobile objects (e.g., ships, airplanes and robots), stationary power supplies and mobile fuel cell systems.

A-1. Overall Configuration of System

In an FCHV system 100, an FC converter 2500 is provided between a fuel cell 110 and an inverter 140, and a DC/DC converter (hereinafter referred to as a battery converter) 180 is provided between a battery 120 and the inverter 140.

The fuel cell 110 is a solid polymer electrolyte cell stack in which a plurality of unit cells are stacked in series. The fuel cell 110 is provided with a voltage sensor V0 for detecting an output voltage Vfcmes of the fuel cell 110 and a current sensor I0 for detecting an output current Ifcmes. In the fuel cell 110, the oxidization reaction represented by formula (1) occurs at an anode, and the reduction reaction represented by formula (2) occurs at a cathode. The electromotive reaction represented by formula (3) occurs in the entire fuel cell 110.

$$H_2 \rightarrow 2H^+ + 2e^- \quad (1)$$

$$(1/2)O_2 + 2H^+ + 2e^- \rightarrow H_2O \quad (2)$$

$$H_2 + (1/2)O_2 \rightarrow H_2O \quad (3)$$

A unit cell has a configuration in which: a polymer electrolyte membrane, etc., is interposed between two electrodes, a fuel electrode and an air electrode, to form an MEA; and the MEA is interposed between separators for supplying fuel gas and oxidant gas. In the anode, an anode catalyst layer is provided on a porous support layer, and in the cathode, a cathode catalyst layer is provided on a porous support layer.

The fuel cell 110 has a system for supplying the fuel gas to the anode, a system for supplying the oxidant gas to the cathode and a system for providing a coolant, which are not shown in the figure, and is able to generate desired power by controlling the fuel gas supply and the oxidant gas supply according to control signals from a controller 160.

The FC converter 2500 has a role of controlling the output voltage Vfcmes of the fuel cell 110, and is a bidirectional voltage converter that converts (increases or decreases) the output voltage Vfcmes input to a primary side (input side, fuel cell 110 side) to have a voltage value different from the primary side and outputs it to a secondary side (output side, inverter 140 side), and conversely converts a voltage input to the secondary side to have a voltage different from the secondary side and outputs it to the primary side. The FC converter 2500 controls the output voltage Vfcmes of the fuel cell 110 to be a voltage in accordance with a target output.

The battery 120 is connected in parallel with the fuel cell 110 with respect to a load 130, and functions as a storage source of surplus power, a storage source of regenerated energy during regeneration braking, and an energy buffer during a load variation as a result of acceleration or deceleration of a fuel cell vehicle. The battery 120 is constituted by a secondary battery such as a nickel/cadmium battery, a nickel/hydrogen battery or a lithium secondary battery.

The battery converter 180 has a role of controlling an input voltage of the inverter 140, and has the same circuit configuration as that of, e.g., the FC converter 2500. A voltage increase converter may be employed as the battery converter 180, and a voltage increase/decrease converter that can perform a voltage increasing operation and a voltage decreasing operation may also be employed. A converter having any configuration that can control the input voltage of the inverter 140 may be employed.

The inverter 140 is, for example, a PWM inverter driven by a pulse width modulation method. In accordance with a control command provided by the controller 160, the inverter 140 converts direct-current power output from the fuel cell 110 or the battery 120 to three-phase alternating current power, thereby controlling a rotation torque of a traction motor 131.

The traction motor 131 serves as the main motive power of the vehicle in this embodiment, and it also generates regenerative power during deceleration. A differential 132 is a decelerator, decelerating a high-speed rotation of the traction motor 131 to a predetermined rotation frequency and rotating a shaft to which tires 133 are provided. The shaft has a wheel speed sensor (not shown), etc., thereby detecting the vehicle speed, etc., of the vehicle. In this embodiment, all the equipment (including the traction motor 131 and the differential 132) operable upon receiving power supplied from the fuel cell 110 are collectively referred to as the load 130.

The controller 160 is a computer system for controlling the FCHV system 100, and has a CPU, RAM, ROM, etc. The controller 160 receives, as inputs, various signals (e.g., a signal representing an acceleration opening degree, a signal representing a vehicle speed, and a signal representing an output current or output terminal voltage of the fuel cell 110) supplied from a sensor group 170, and obtains the power required from the load 130 (i.e., the power required for the entire system).

The power required from the load 130 corresponds to the total value of, for example, vehicle driving power and auxiliary-apparatus power. The auxiliary-apparatus power includes, e.g., power consumed by vehicle-mounted auxiliary apparatuses (humidifier, air compressor, hydrogen pump, cooing water circulation pump, etc.), power consumed by devices necessary for vehicle driving (change gear, wheel control device, steering device, suspension device, etc.), and power consumed by devices arranged in an occupant space (air-conditioning device, illumination device, audio equipment, etc.).

The controller (converter controller) 160 determines an output power distribution ratio of the fuel cell 110 and the battery 120 and computes a power generation command value. The controller 160 calculates the power required for the fuel cell 110 and the battery 120, and then controls the operations of the FC converter 2500 and the battery converter 180 in order to obtain the above required power.

A-2. Configuration of FC Converter

As shown in FIG. 1, the FC converter 2500 has a circuit configuration of a three-phase resonance converter which includes a U-phase, a V-phase and a W-phase. The circuit configuration of the three-phase resonance converter has a combination of a circuit portion similar to an inverter, which temporarily converts an input direct-current voltage to an alternating current, and a portion that rectifies the alternating current again and converts it to a different direct-current voltage. In this embodiment, a multiphase soft switching converter having a free-wheel circuit (described below in detail) (hereinafter referred to as a multiphase FC soft switching converter) is employed as the FC converter 2500.

A-2-1. Description of Multiphase FC Soft Switching Converter

Figure 2:
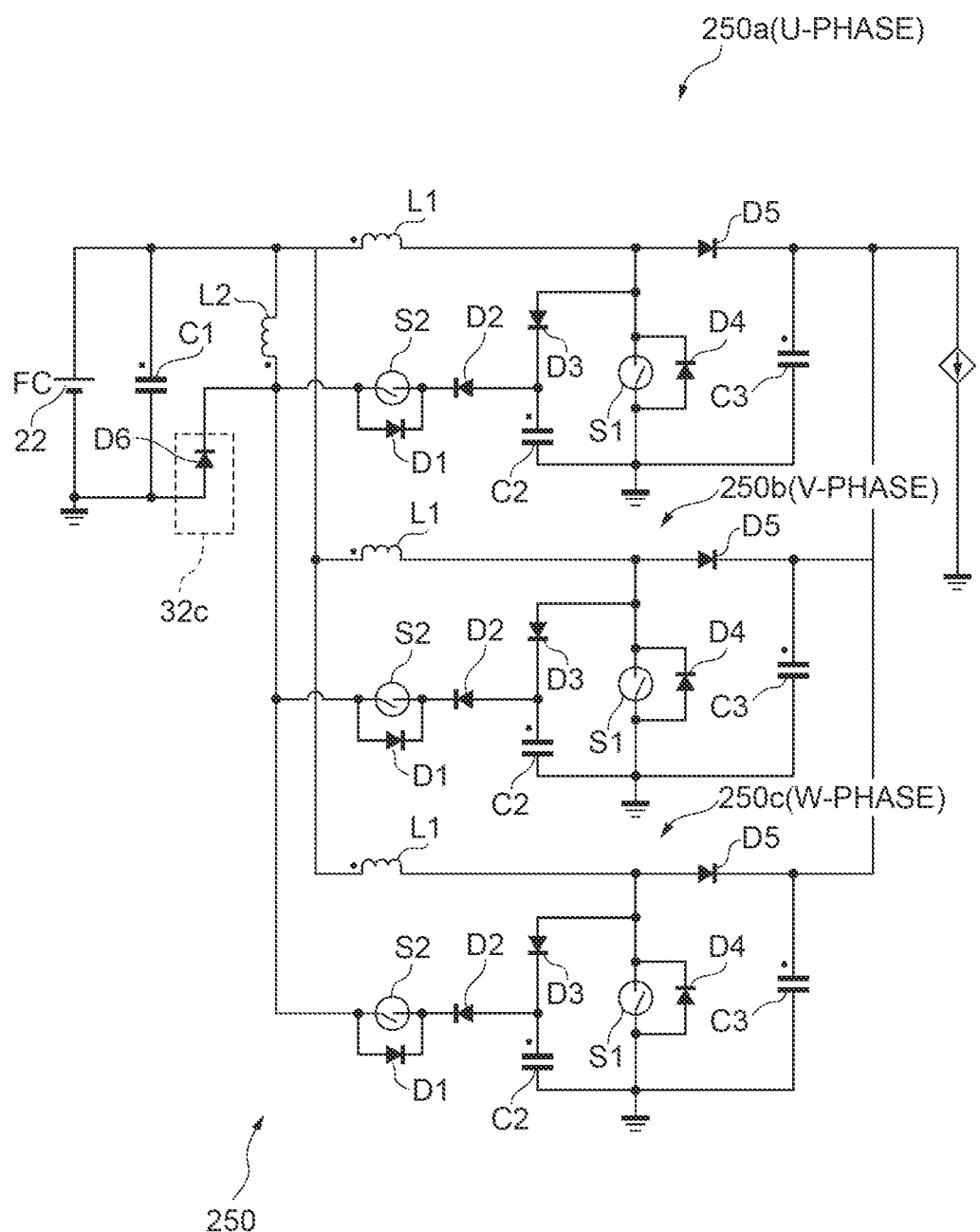
FIG. 2 is a diagram illustrating a circuit configuration of a multiphase FC soft switching converter according to the embodiment.
Figure 3:
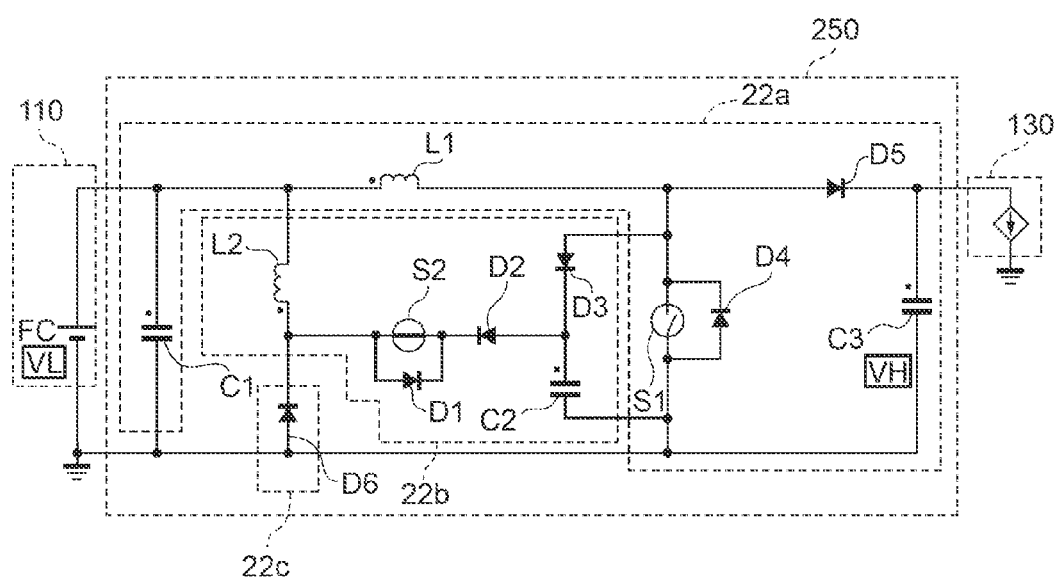
FIG. 3 is a diagram illustrating a circuit configuration for one phase of an FC soft switching converter according to the embodiment.

FIG. 2 is a diagram illustrating a circuit configuration of the multiphase FC soft switching converter 2500 mounted on the FCHV system 100. FIG. 3 is a diagram illustrating a circuit configuration for one phase of the multiphase FC soft switching converter 2500.

In the description below, the respective FC soft switching converters of the U-phase, V-phase and W-phase, which constitute the multiphase FC soft switching converter 2500, are referred to as FC soft switching converters 250a, 25b and 250c, and when there is no particular need to distinguish these converters, they each are simply referred to as an FC soft switching converter 250. Also, a voltage before voltage increase which is input to the FC soft switching converter 250 is referred to as an input voltage Vin, and a voltage after voltage increase which is output from the FC soft switching converter 250 is referred to as an output voltage Vout.

As shown in FIG. 3, each of the FC soft switching converters 250 is provided with a main voltage-increasing circuit 22a for performing a voltage increasing operation, an auxiliary circuit 22b for performing a soft switching operation and a free-wheel circuit 22c.

In the main voltage-increasing circuit 22a, with a switching operation of a switching circuit constituted by a first switching element S1 constituted of, e.g., an IGBT (Insulated Gate Bipolar Transistor) and a diode D4, energy stored in a coil L1 is released to the load 130 via a diode D5, thereby increasing the output voltage of the fuel cell 110.

More specifically, one end of the coil L1 is connected to a high-potential side terminal of the fuel cell 110, one of the electrodes of the first switching element S1 is connected to the other end of the coil L1, and the other electrode of the first switching element S1 is connected to a low-potential side terminal of the fuel cell 110. Also, a cathode terminal of the diode D5 is connected to the other end of the coil L1, and a capacitor Cd that functions as a smoothing capacitor is connected between an anode terminal of the diode D5 and the other end of the first switching element S1. The main voltage-increasing circuit 22a is provided with a smoothing capacitor C1 on the fuel cell 110 side, thereby reducing a ripple of an output current of the fuel cell 110.

Here, a voltage VH applied to the capacitor C3 serves as the converter output voltage Vout of the FC soft switching converter 150, and a voltage VL applied to the smoothing capacitor C1 serves as an output voltage of the fuel cell 110, and also serves as the converter input voltage Vin of the FC soft switching converter 150.

The auxiliary circuit 22b includes a first series connection having: a diode D3 connected in parallel with the first switching element S1; and a snubber capacitor C2 serially connected to the diode D3. In the first series connection, a cathode terminal of the diode D3 is connected to the other end of the coil L1, and an anode terminal of the diode D3 is connected to one of the ends of the snubber capacitor C2. The other end of the snubber capacitor C2 is connected to the low-potential side terminal of the fuel cell 110.

Further, the auxiliary circuit 22b includes a second series connection constituted by a diode D2, a second switching element S2, a diode D1 and an auxiliary coil L2 that is common to the phases.

In the second series connection, an anode terminal of the diode D2 is connected to a connecting part between the diode D3 and the snubber capacitor C2 in the first series connection. Also, a cathode terminal of the diode D2 is connected to one of the electrodes of the second switching element (auxiliary switch) S2. The other electrode of the second switching element S2 is connected to a connecting part between the auxiliary coil L2 and the free-wheel circuit 22c. An anode terminal of a free-wheel diode D6 is connected to the low-potential side terminal of the fuel cell 110, while a cathode terminal of the free-wheel diode D6 is connected to the auxiliary coil L2. The free-wheel circuit 22c includes the free-wheel diode D6 shared by the phases, and is a circuit for realizing a fail-safe function which is provided to prevent the occurrence of a surge voltage that destructs the second switching element S2 even when an open fault of the second switching element S2 occurs while the auxiliary coil L2 is energized. Note that the present invention may be applied also to a configuration not including the free-wheel circuit 22c.

In the FC soft switching converter 25 configured as described above, the controller 160 adjusts a switching duty ratio of the first switching element S1 of each phase, thereby controlling a ratio of the voltage increased by the FC soft switching converter 25, i.e., the ratio of the converter output voltage Vout to the converter input voltage Vin. Also, the switching operation of the first switching element S1 is combined with the switching operation of the second switching element S2 in the auxiliary circuit 12b, thereby realizing soft switching.

Figure 4:
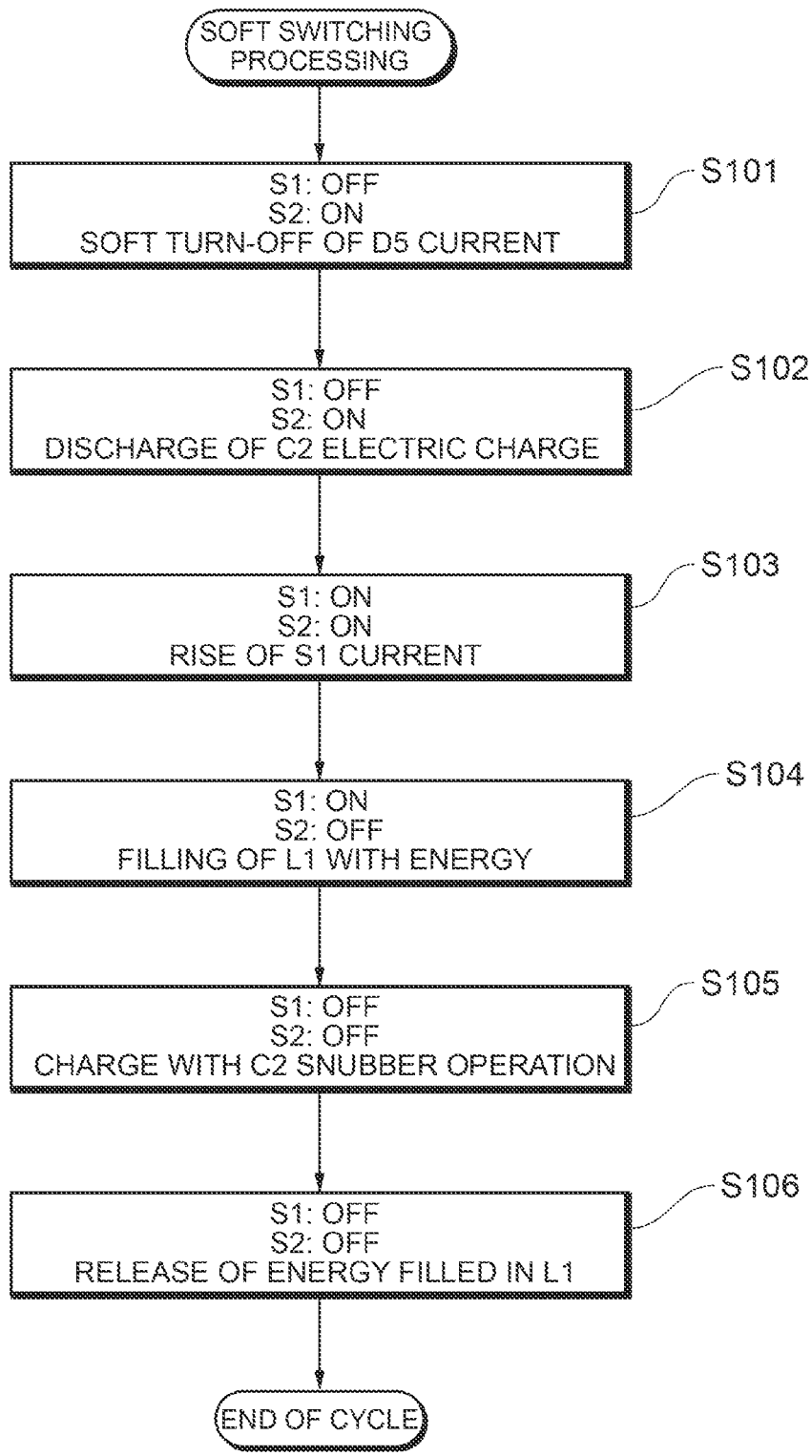
FIG. 4 is a flowchart showing soft switching processing according to the embodiment.

Next, a soft switching operation by the FC soft switching converter 25 will be described with reference to FIGS. 4 to 8. FIG. 4 is a flowchart showing a cycle of processing of the FC soft switching converter 25 via a soft switching operation (hereinafter referred to as soft switching processing), and the controller 160 carries out steps S101 to S106 in FIG. 4 sequentially so as to form one cycle. In the description below, the modes that represent the current/voltage states of the FC soft switching converter 25 are denoted by mode 1 to mode 6, the states being illustrated in FIGS. 5 to 8. In FIGS. 5 to 8, the currents flowing through circuits are indicated by arrows.

Soft Switching Operation

First, the initial state of the soft switching processing shown in FIG. 4 is the state where power required by the fuel cell 110 for the load 130 is being supplied, i.e., the state where both the first switching element S1 and the second switching element S2 are turned off so that a current is supplied to the load 130 through the coil L1 and the diode D5.

(Mode 1; See FIG. 5)

In step S101, while the turn-off of the first switching element S1 is held, the second switching element S2 is turned on. By performing such a switching operation, the current flowing on the load 130 side gradually moves to the auxiliary circuit 12b side through the coil L1, the diode D3, the second switching element S2 and the auxiliary coil L2 due to the potential difference between the output voltage VH and the input voltage VL of the FC soft switching converter 150. Note that, in FIG. 5, the state of the movement of the current from the load 130 side to the auxiliary circuit 12b side is indicated by an outline arrow.

Figure 5:
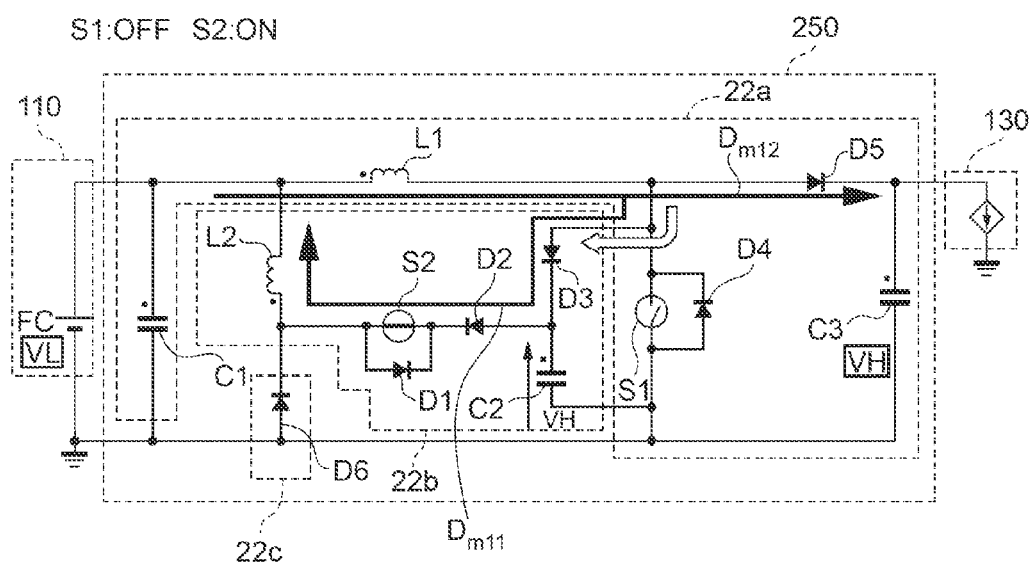
FIG. 5 is a diagram illustrating the operation of mode 1.

The second switching element S2 is turned on, whereby a current circulation in the direction of arrow Dm11 shown in FIG. 5 is generated. Here, the rate of current change of the second switching element S2 increases in accordance with the voltage across the auxiliary coil L2 (VH−VL) and the inductance of the auxiliary coil L2; however, the current flowing to the second switching element S2 is reduced by the auxiliary coil L2. As a result, a soft turn-off of the current flowing to the load 130 side through the diode D5 (see arrow Dm12 in FIG. 5) is realized.

Here, a shift completion time tmode1 for a shift from mode 1 to mode 2 is represented by expression (4) below.

$$tmode1 = \max\left(Ip - \frac{\Delta I}{2}, 0\right) \times \frac{L2id}{(VH - VL)} \quad (4)$$

Ip: phase current
L2id: inductance of the auxiliary coil L2

(Mode 2; See FIG. 6)

Figure 6:
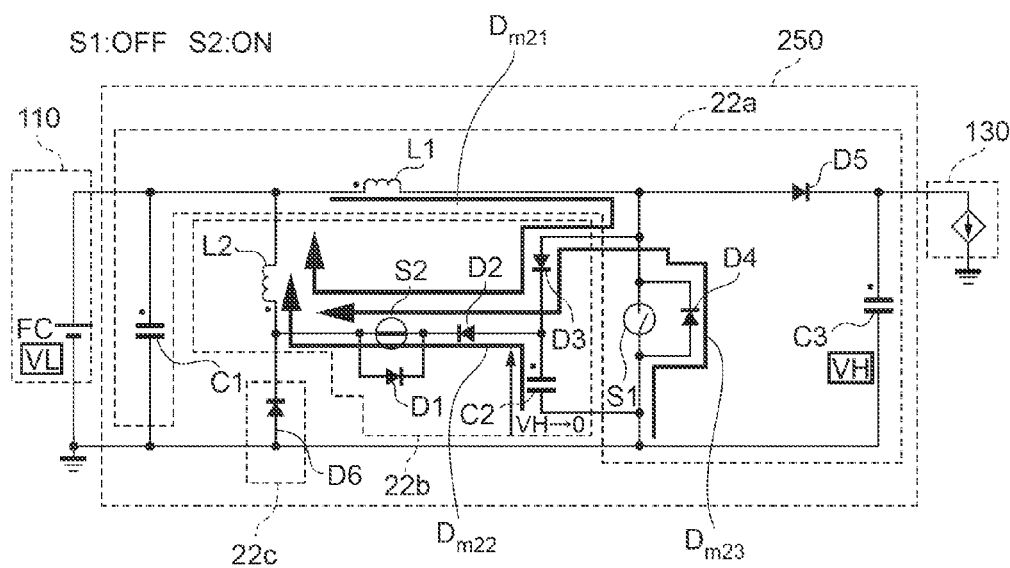
FIG. 6 is a diagram illustrating the operation of mode 2.
Figure 7:
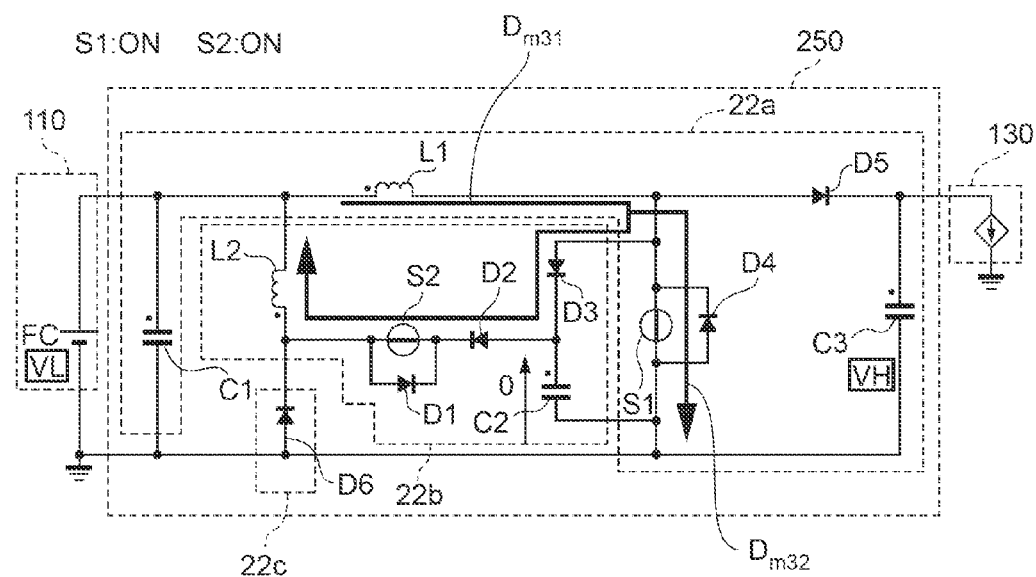
FIG. 7 is a diagram illustrating the operation of mode 3.

After the above shift completion time passes and the processing proceeds to step S102, the current flowing through the diode D5 becomes zero, and the current flows to the auxiliary circuit 12b side via the coil L1 and the diode D5 (see arrow Dm21 in FIG. 6). Meanwhile, the charge stored in the snubber capacitor C2 flows to the auxiliary circuit 12b side due to the potential difference between the voltage VH of the snubber capacitor C2 and the voltage VL of the fuel cell 110 (see arrow Dm22 in FIG. 6). The voltage applied to the first switching element S1 is determined in accordance with the capacitance of the snubber capacitor C2.

Figure 12:
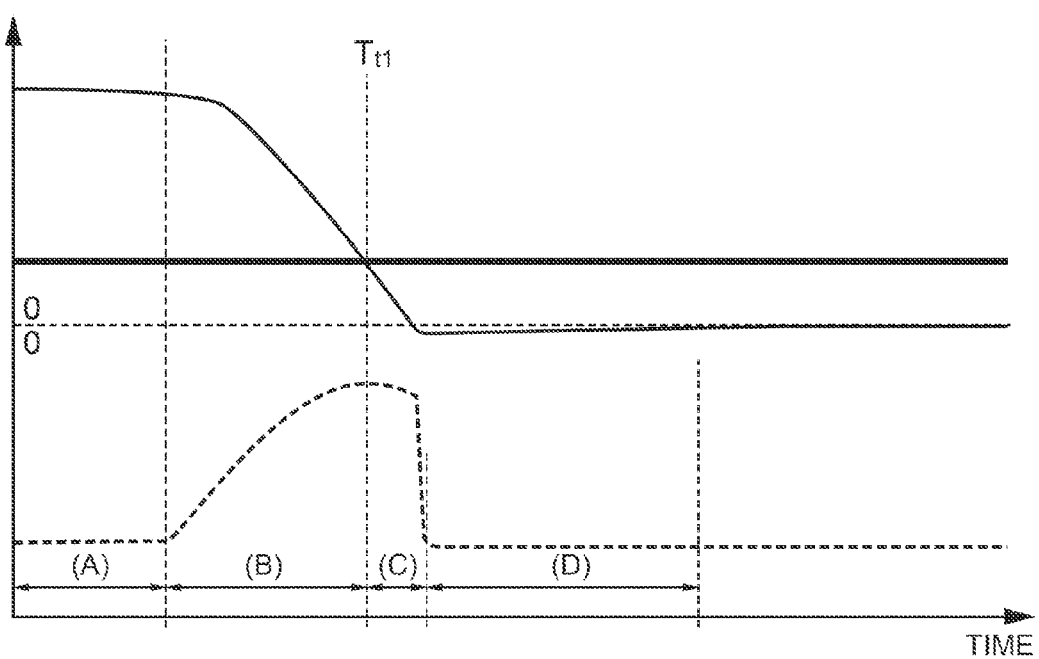
FIG. 12 is a diagram illustrating voltage/current behavior in a shift process from mode 2 to mode 3.

Here, FIG. 12 is a diagram illustrating voltage/current behavior in the process of a shift from mode 2 to mode 3, where: the voltage of the fuel cell 110 is indicated by a thick solid line; the voltage of the snubber capacitor C2 is indicated by a thin solid line; and the current of the snubber capacitor C2 is indicated by a dashed line.

After energization of the path of Dm 21 in FIG. 6 is started (see (A) in FIG. 12), energization of the path of Dm22 in FIG. 6, i.e., energization to the auxiliary coil L2 is started due to the potential difference between the voltage VH of the snubber capacitor C2 and the voltage VL of the fuel cell 110 (see (B) in FIG. 12). Here, as shown in FIG. 12, the current of the snubber capacitor C2 continues to increase until the voltage of the snubber capacitor C2 reaches the voltage VL of the fuel cell 110. More specifically, the charge stored in the snubber capacitor C2 starts to be regenerated on the power supply side due to the potential difference between the voltage VH of the snubber capacitor C2 and the voltage VL of the fuel cell 110 (arrow Dm22 in FIG. 6). However, the original potential difference is (VH−VL), and therefore, the flow of the electric charge (discharge) stored in the snubber capacitor C2 stops when the voltage VH reaches the power supply voltage (i.e., the voltage VL of the fuel cell 110) (see point in time T1 in FIG. 12); meanwhile, the characteristic of the auxiliary coil L2 (i.e., the characteristic that keeps a current flowing continuously) keeps the electric charge flowing even when the voltage of the snubber capacitor C2 is equal to or lower than the voltage VL (see (C) in FIG. 12). At this point, if expression (4)' below holds, the entire electric charge of the snubber capacitor C2 flows (discharges).

$$\frac{1}{2}L*I^2 > \frac{1}{2}C*V^2 \tag{4}'$$

Left side: energy stored in the auxiliary coil L2
Right side: energy remaining in the snubber capacitor C2

When the electric charge stored in the snubber capacitor C2 is emptied out of the snubber capacitor C2, a free-wheel operation is performed using the path of Dm23 in FIG. 6 to continue energization (see (D) in FIG. 12). As a result, all the energy stored in the auxiliary coil L2 is discharged. Note that the LC resonance is half-wave resonant because the anode of the diode D2 is connected to the relevant end of the auxiliary coil L2. Therefore, the snubber capacitor C2 holds 0 V after discharge.

Here, a shift completion time tmode2 for a shift from mode 2 to mode 3 is represented by expression (5) below.

$$tmode2 = tmode2' + tmode2'' \tag{5}$$

$$tmode2' = \pi\sqrt{L2id*C2d} \tag{5}'$$

$$tmode2'' = \max\left(Ip - \frac{\Delta I}{2}, 0\right) \times \frac{L2id}{VL} \tag{5}''$$

C2d: capacitance of the capacitor C2
(Mode 3; See FIG. 7)

When the operation in which a current flows in the Dm22 path in FIG. 6, and the electric charge is emptied out of the snubber capacitor C2 or is at the minimum voltage (MIN voltage), the first switching element S1 is turned on, and the processing proceeds to step S103. With the voltage of the snubber capacitor C2 being zero, the voltage applied to the first switching element S1 is also zero, and thus ZVS (Zero Voltage Switching) is attained. In such a state, a current Il1 flowing through the coil L1 corresponds to the sum of a current Idm31 flowing on the auxiliary circuit 12b side which is indicated by arrow Dm31 and a current Idm32 flowing via the first switching element S1 which is indicated by arrow Dm32 (see expression (6) below).

$$Il1 = Idm31 + Idm32 \tag{6}$$

The current Idm31 flowing through the first switching element S1 is determined in accordance with the rate of reduction of the current Idm31 flowing to the auxiliary circuit 12b side. The rate of current change of the current Idm31 flowing to the auxiliary circuit 12b side is represented by expression (7) below. More specifically, the current Idm31 flowing to the auxiliary circuit 12b side is reduced at the rate of change of expression (7) below, and therefore, even with the first switching element S1 being turned on, the current flowing through the first switching element S1 does not rise rapidly. As a result, ZCS (Zero Current Switching) is attained.

$$\frac{di}{dt} = \frac{-VL}{L2} \tag{7}$$

(Mode 4; See FIG. 8)

Figure 8:
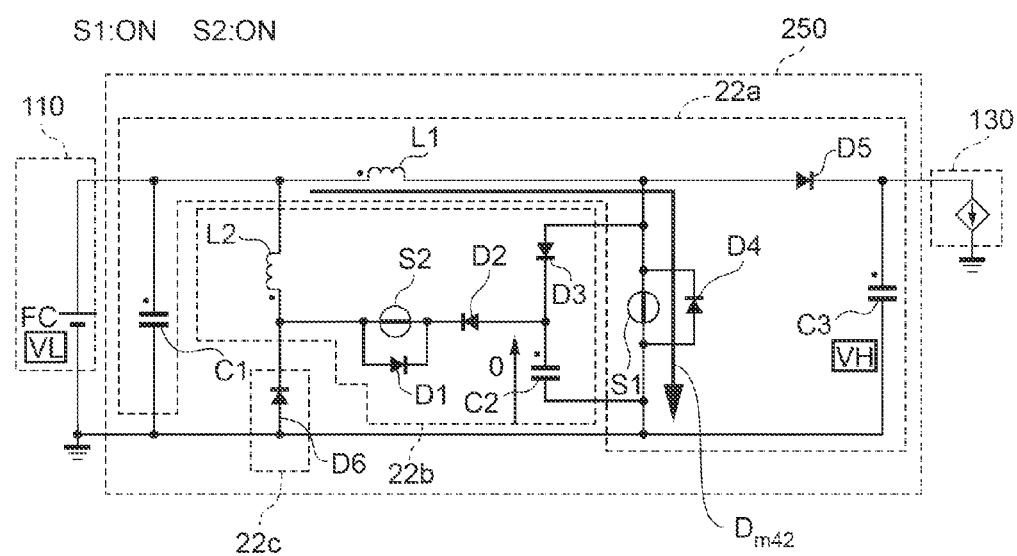
FIG. 8 is a diagram illustrating the operation of mode 4.

In step S104, the amount of current flowing to the coil L1 is increased due to the continuation of the state of step S103, thereby gradually increasing energy stored in the coil L1 (see arrow Dm42 in FIG. 8). Here, the diode D2 exists in the auxiliary circuit 12b, and therefore, an inverse current does not flow to the auxiliary coil L2, so that the snubber capacitor C2 is not charged via the second switching element S2. Also, the first switching element S1 has been turned on at this point, and therefore, the snubber capacitor C2 is not charged via the diode D3. Accordingly, the current for the coil L1 equals the current for the first switching element S1, and the energy stored in the coil L1 is increased gradually. Here, a turn-on time Ts1 of the first switching element S1 is approximately represented by expression (8) below.

$$Ts1 = (1 - VL/VH)*Tcon \tag{8}$$

Tcon: control period

Note that the control period refers to a time period during which soft switching processing is performed with the procedure of from steps S101 to step S106 being assumed as one period (one cycle).

(Mode 5; See FIG. 9)

Figure 9:
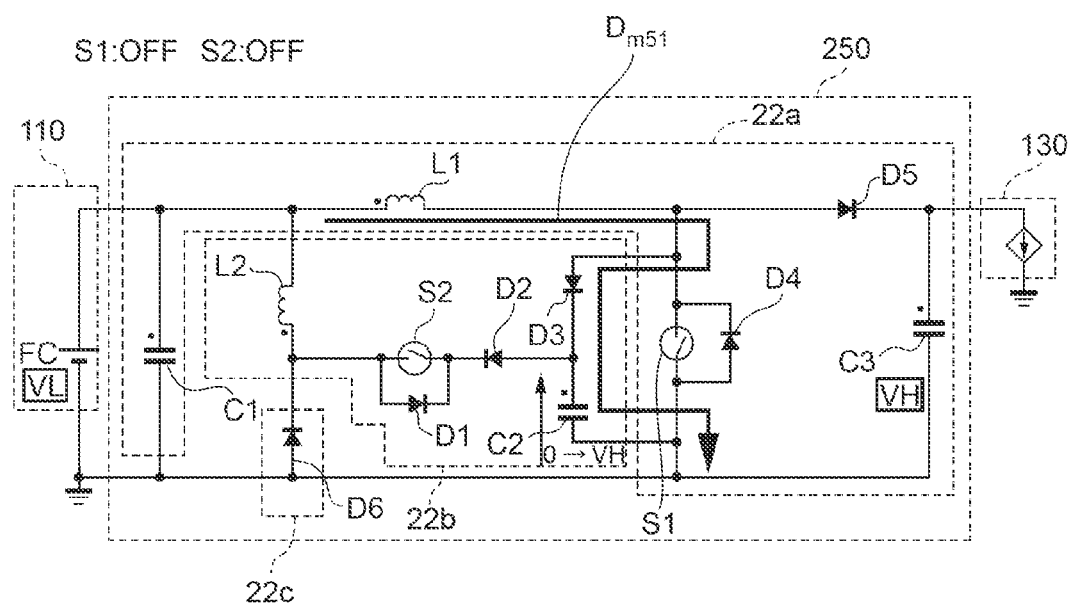
FIG. 9 is a diagram illustrating the operation of mode 5.
Figure 11:
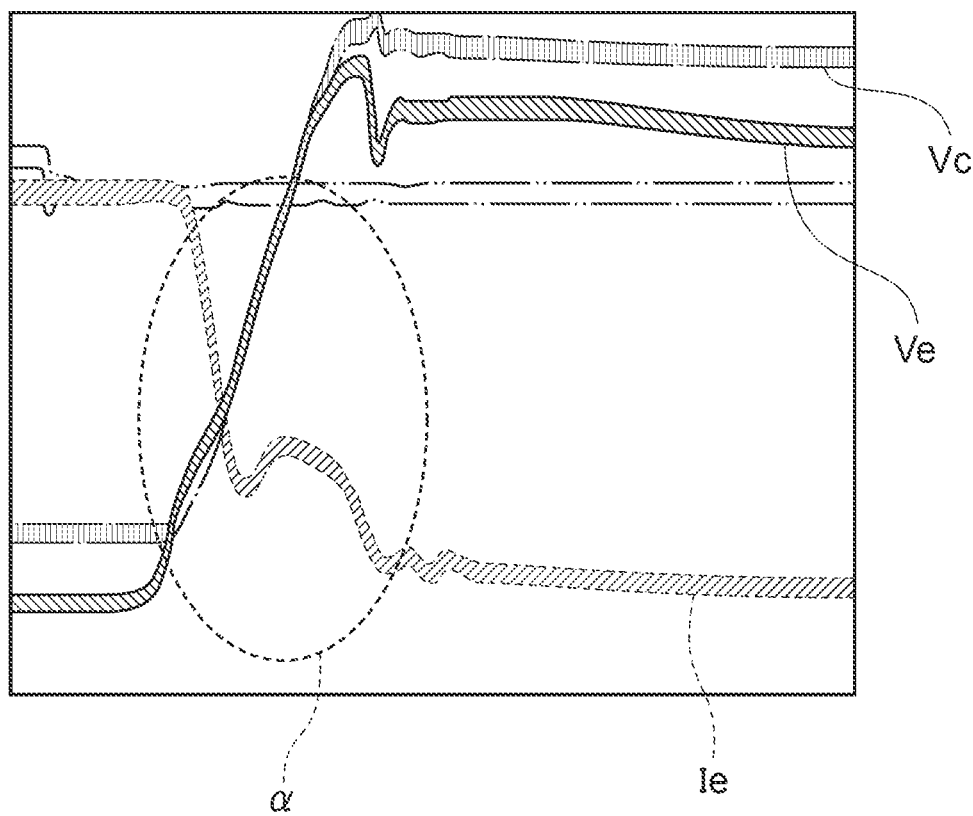
FIG. 11 is a diagram illustrating the relationship in mode 5 between a snubber capacitor voltage Vc, an element voltage Ve and an element current Ie.

After the desired energy is stored in the coil L1 in step S104, the first switching element S12 is turned off, and then a current flows through the path indicated by arrow Dm51 in FIG. 9. Here, FIG. 11 is a diagram illustrating the relationship in mode 5 between the voltage of the snubber capacitor C2 in mode 5 (hereinafter referred to as a snubber capacitor voltage) Vc, the voltage applied to the first switching element S1 (hereinafter referred to as element voltage) Ve, and the current flowing through the first switching element S1 (hereinafter referred to as element current) Ie. When the above switching operation is performed, the snubber capacitor C2, which has been emptied of its electric charge and brought into a low-voltage state in mode 2, is charged, whereby the snubber capacitor voltage Vc rises toward the converter output voltage VH of the FC soft switching converter 150. At this point, the rate of increase of the element voltage Ve is suppressed by the charging of the snubber capacitor C2 (i.e., the rising edge of the element voltage is slowed), and as a result, a ZVS operation for reducing the switching loss in an area of the element current Ve where a tail current exists (see a in FIG. 11) becomes possible to be performed.

Figure 10:
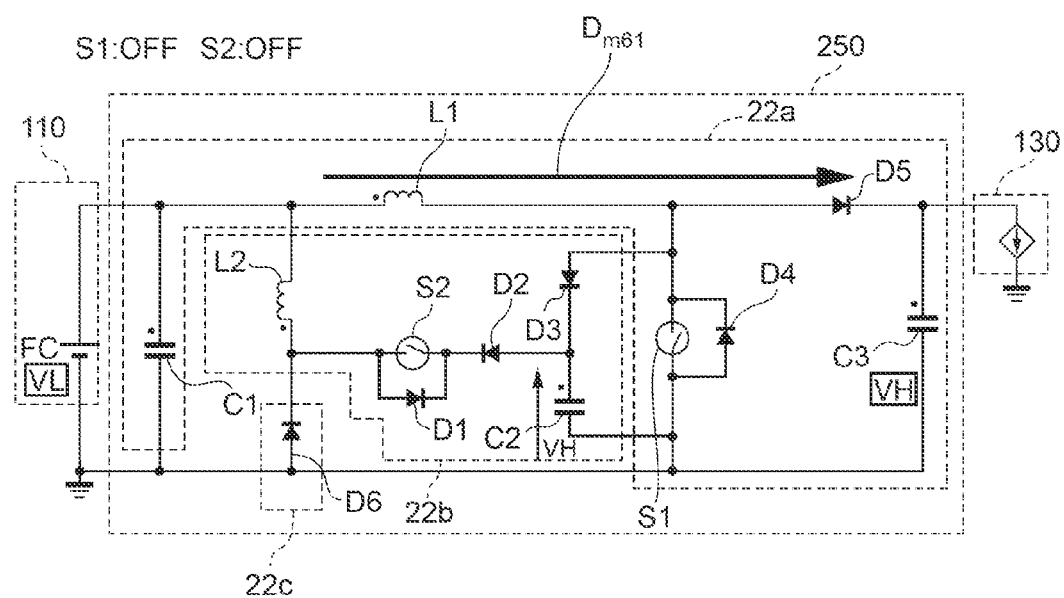
FIG. 10 is a diagram illustrating the operation of mode 6.

(Mode 6; See FIG. 10)

After the snubber capacitor C2 is charged to reach the voltage VH, the energy stored in the coil L1 is released to the load 130 side (see arrow Dm61 in FIG. 9). A turn-off time period Ts2 of the first switching element S1 is approximately represented by expression (9) below.

$$Ts2 = (VL/VH)*Tcon \tag{9}$$

By performing the soft switching processing described above, while the switching loss of the FC soft switching converter 150 is reduced as much as possible, the output voltage of the fuel cell 110 can be increased to a desired voltage so that the relevant voltage is supplied to the load 130.

Figure 13:
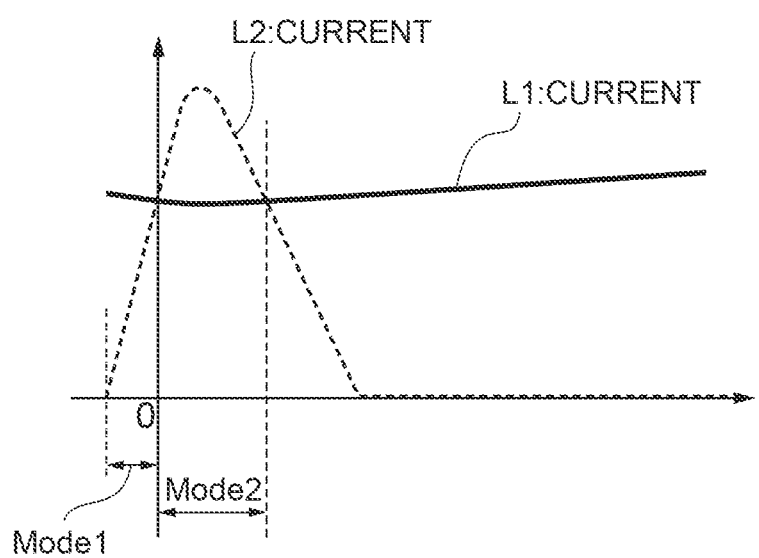
FIG. 13 is a diagram illustrating energization patterns in the modes.

FIG. 13 is a diagram illustrating energization patterns in the respective modes of the FC soft switching converter 25, where: the current flowing through the coil L1 is indicated by a thick solid line; and the current flowing though the auxiliary coil L2 is indicated by a dashed line.

Figure 16:
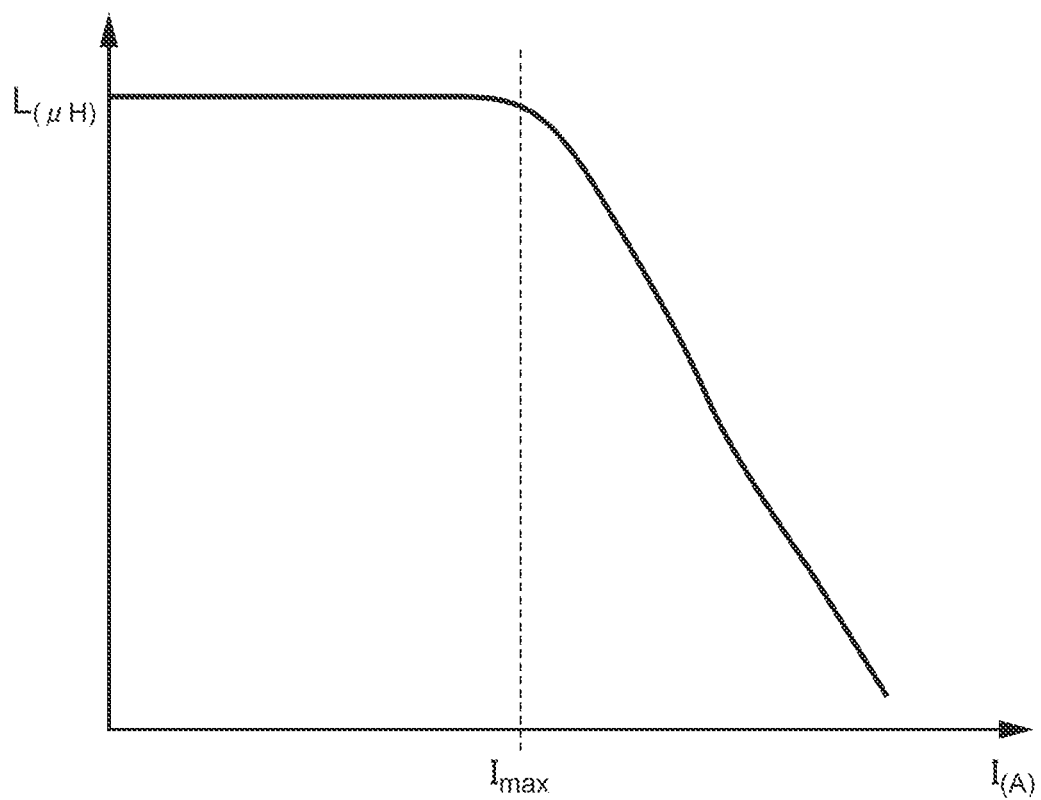
FIG. 16 is a diagram illustrating an inductance characteristic of an auxiliary coil.

As shown in FIG. 13, when the second switching element is turned on, the auxiliary circuit 12b operates, so that a current flows through the auxiliary coil L2 (see mode 1 and mode 2 in FIG. 13). When time periods during which a current flows in the auxiliary coil L2 (hereinafter referred to as auxiliary circuit operating time periods) Tso overlap between the FC soft switching converters 25 of the respective phases, the operations of the auxiliary circuits of the respective phases interfere with one another, and as a result, a current Iu equal to or larger than the maximum acceptable current Imax (i.e., a current of two or more phases) flows through the auxiliary coil L2, leading to deterioration of the inductance characteristic of the auxiliary coil L2 (see the section of the problem to be solved by the invention and FIG. 16).

In order to solve the above problem, in this embodiment, the deviation between the duty ratios set for the second switching elements S2 of the respective phases is controlled not to exceed an acceptable duty deviation value Dth indicated by expression (10) below.

$$Dth = \frac{(Tsc/n - Tso)}{Tsc} = 1/n - Tso * f \quad (10)$$

f: drive frequency of the switching element S2
Tsc: 1 cycle period of time(=1/f)
n: number of drive phases
Here, the auxiliary circuit operating time period Tso is represented by expression (11) below.

$$Tso = tmode1 + tmode2 \quad (11)$$
$$= \max\left(Ip - \frac{\Delta I}{2}, 0\right) \times \frac{L2id}{(VH - VL)} + \pi\sqrt{L2id * C2d} +$$
$$\max\left(Ip - \frac{\Delta I}{2}, 0\right) \times \frac{L2id}{VL}$$

In this embodiment, a control is carried out such that the duty deviation between the phases does not exceed the acceptable duty deviation value Dth obtained using expression (10). More specifically, the control is carried out such that a U-phase duty ratio D(u), a V-phase duty ratio D(v) and a W-phase duty ratio D(s) satisfy expressions (12) to (14) below.

$$D(v)-D(u)<Dth \quad (12)$$
$$D(w)-D(v)<Dth \quad (13)$$
$$D(u)-D(w)<Dth \quad (14)$$

Figure 14:
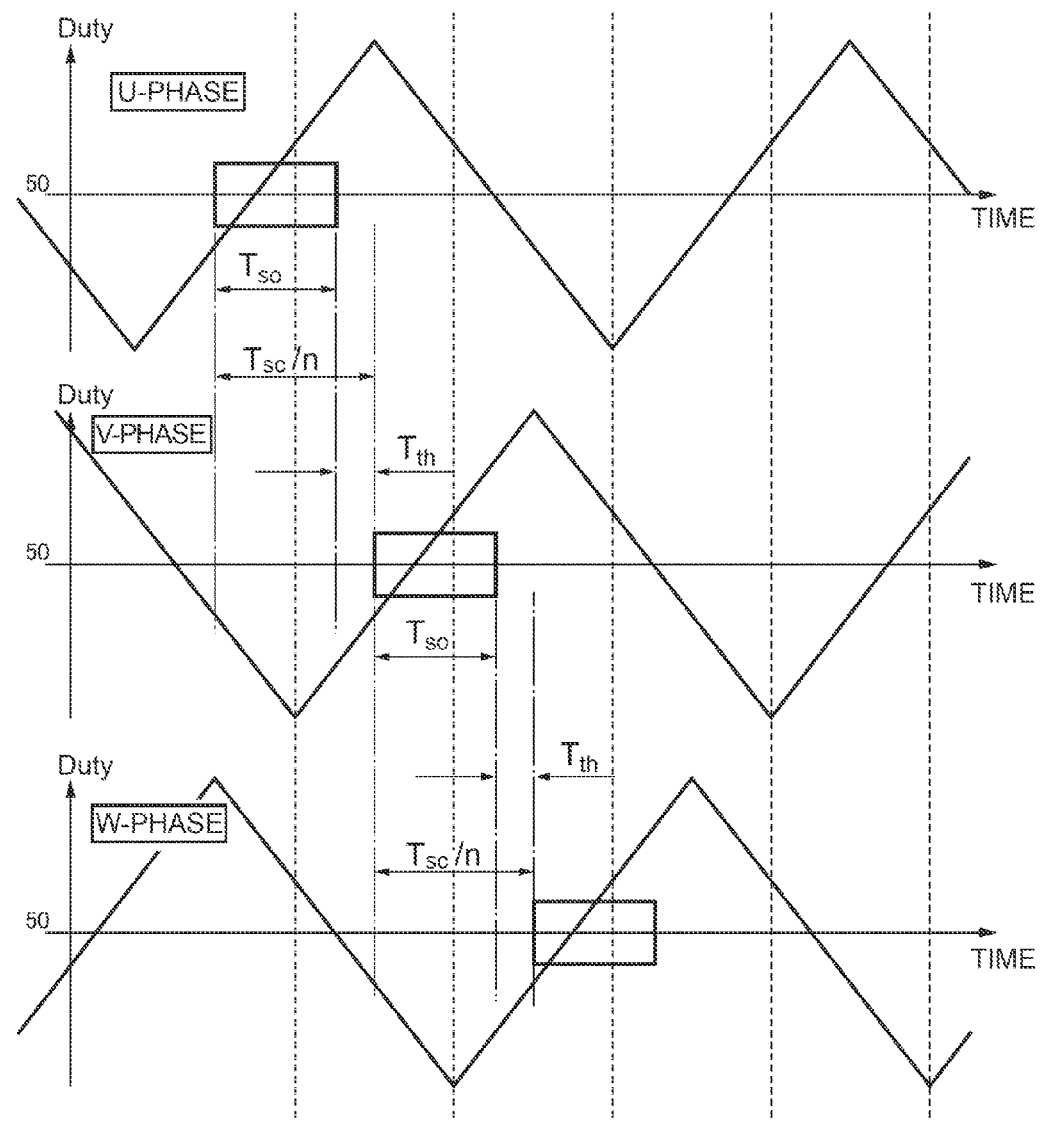
FIG. 14 is a diagram illustrating waveforms of duty ratio control pulses in a three-phase FC soft switching converter with a phase shift in the order of a U-phase, through a V-phase, to a W-phase.

Here, the acceptable duty deviation time period Tth of each phase will be described with reference to FIG. 13, taking, as an example, the case of a duty ratio of each phase being 50%. FIG. 14 is a diagram illustrating waveforms of duty ratio control pulses in the FC soft switching converters 250 of the three phases with a phase shift in the order of the U-phase, through the V-phase, to the W-phase.

The duty ratio control pulses of the phases in FIG. 14 are generated by a pulse generator (not shown) that generates triangular waves each of which is phase-shifted by 120 degrees. These duty ratio control pulses control the duty ratio of the second switching element S2 that constitutes the auxiliary circuit 22b of the U-phase, V-phase or W-phase.

As shown in FIG. 14, the acceptable duty deviation time period Tth of each phase for the case of a duty ratio of 50% is represented by expression (10)'.

$$Tth=Tso-Tsc/n \quad (10)'$$

As described above, in this embodiment, the DC/DC converter 20 is controlled such that the duty deviation between the phases does not exceed the acceptable duty deviation value Dth represented by expression (10) (in other words, the duty deviation time period between the phases does not exceed the acceptable duty deviation time period Tth represented by expression (10)'). This prevents operation interference between the auxiliary circuits 22c of the phases, thereby solving a problem in the related art, i.e., preventing the occurrence of a circuit failure (e.g., element destruction). Hereinafter, a control of the duty ratio of the second switching element S2 for preventing the operation interference between the auxiliary circuits 22c of the phases (hereinafter referred to as interference prevention duty control) will be described in detail with reference to the functional blocks in FIG. 15.

Interference Prevention Duty Control

Figure 15:
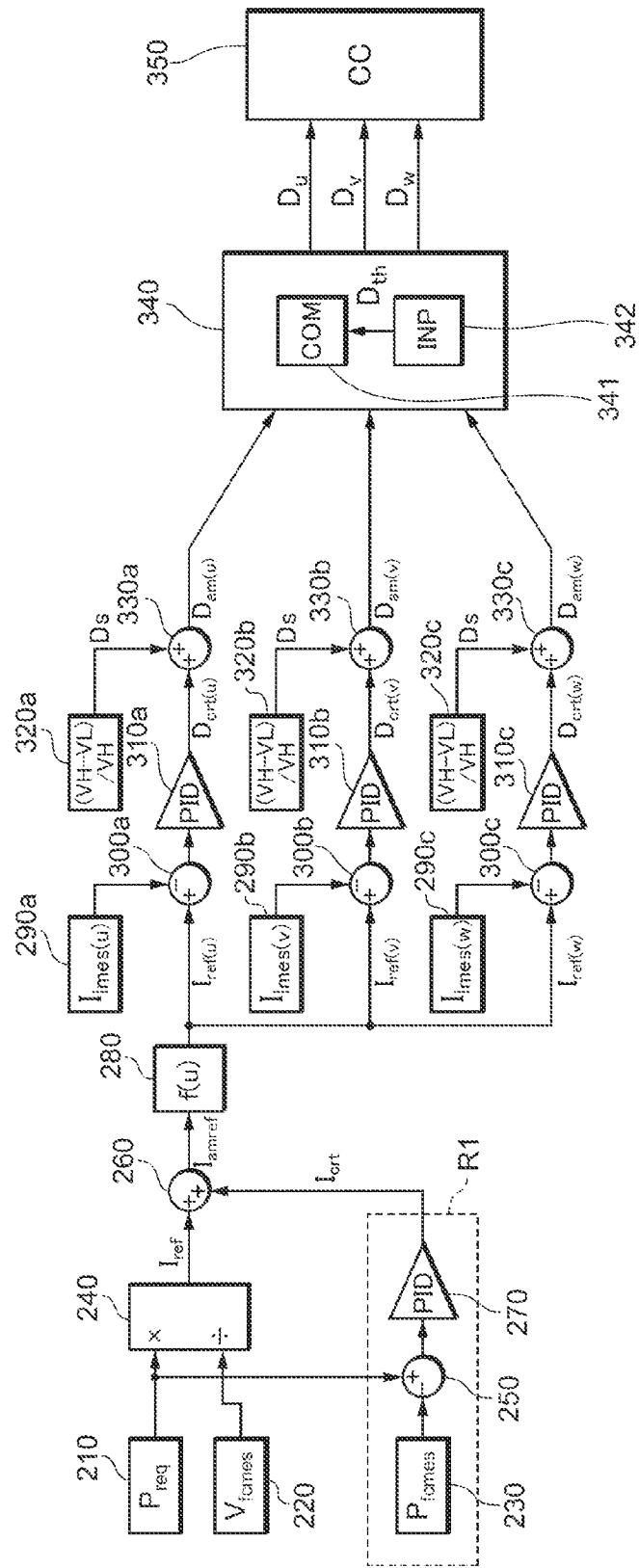
FIG. 15 is a functional block diagram explaining an interference prevention duty control function.

FIG. 15 is a functional block diagram explaining an interference prevention duty control function realized by the controller 160, etc. As described above, this embodiment assumes the case where the output of the fuel cell 110 is controlled using the three-phase resonance type FC soft switching converter 2500 that includes the U-phase, V-phase and W-phase.

An FC-request power input unit 210 derives a request power command value with respect to the fuel cell 110 (hereinafter referred to as an FC-request power command value) Preq based on the power required from the load 130, and outputs the derived value to a command current computation unit 240.

An FC voltage input unit 220 receives, as an input, the output voltage Vfcmes of the fuel cell 110 which is detected by the voltage sensor V0, and outputs the output voltage Vfcmes to the command current computation unit 240 and a deviation computation unit 250.

An FC measurement power input unit 230 receives, as an input, an actual output power measurement value of the fuel cell 110 (hereinafter referred to as an FC output power measurement value) Pfcmes, and outputs the actual output power measurement value to the deviation computation unit 250. Here, the FC output power measurement value Pfcmes may be obtained from the output voltage Vfcmes of the fuel cell 110, which is detected by the voltage sensor V0, and the output current Ifcmes of the fuel cell 110, which is detected by the current sensor 10. Also, the FC output power measurement value Pfcmes may be directly obtained using, e.g., a power meter (second measurement unit).

The command current computation unit 240 derives a request current command value with respect to the fuel cell 110 (hereinafter referred to as an FC-request current command value) Iref by, for example, dividing the FC-request power command value Preq provided by the FC-request power unit 210 by the output voltage Vfcmes of the fuel cell 110 provided by the FC voltage input unit 220. The command current computation unit 240 then outputs the derived FC-request current command value Iref to a command current correction unit 260.

The deviation computation unit 250 obtains a power deviation (difference) between the FC-request power command value Preq and the FC output power measurement value Pfcmes, and outputs the obtained power deviation to a PID correction computation unit 270.

The PID correction computation unit 270 computes a correction Icrt of the request current command value with respect to the fuel cell 110 based on the power deviation output from the deviation computation unit 250 under a PID control rule, and outputs the calculated correction Icrt to the command current correction unit 260.

The command current correction unit 260 adds the correction output from the PID correction computation unit 270 (PID correction factor) Icrt to the FC-request current command value Iref output from the command current computation unit 240, thereby producing an adjusted FC current command value Iamref. The command current correction unit 260 then outputs the produced adjusted FC current command value Iamref to a phase current distribution unit 280.

The phase current distribution unit 280 derives a target current command value of each phase by dividing the adjusted FC current command value Iamref by the number of drive phases that maximizes the conversion efficiency of the FC converter 150. Here, the number of drive phases that maximizes the conversion efficiency of the FC converter 150 depends on the power required for the fuel cell 110, operating environment, etc. (hereinafter collectively referred to as "operation status"). Therefore, the correspondence relationship between the operation status and the number of drive phases that maximizes the conversion efficiency of the FC converter 150 is obtained in advance through experiments, etc., and is formed into a map. The obtained map is held as a number-of-drive-phases determination map. Upon receiving the adjusted FC current command value Iamref from the command current correction unit 260, the phase current distribution unit 280 recognizes the operation status of the fuel cell 110; determines the number of drive phases that maximizes the conversion efficiency of the FC converter 150 under the current operation status by referring to the number-of-drive-phases determination map; and divides the adjusted FC current command value Iamref by the determined number of drive phases, thereby deriving the target current command value of each phase, more specifically, a target U-phase current value Iref(u), a target V-phase current d value Iref(v) and a target W-phase current value Iref(w).

A U-phase measurement current input unit 290a receives, as an input, a U-phase reactor current measurement value Ilmes(u) detected by a current sensor 11, and outputs the U-phase reactor current measurement value Ilmes(u) to a U-phase deviation computation unit 300a. The U-phase deviation computation unit 300a obtains a U-phase current deviation by subtracting the U-phase reactor current measurement value Ilmes(u) from the target U-phase current value Iref(u).

A U-phase PID correction computation unit 310a computes a U-phase duty ratio correction Dcrt(u) based on the U-phase current deviation output from the U-phase deviation computation unit 300a under the PID control rule, and outputs the computed U-phase duty ratio correction Dcrt(u) to a U-phase duty ratio correction unit 330a.

A U-phase basic duty ratio input unit 320a receives, as an input, a U-phase basic duty ratio Ds, and outputs the U-phase basic duty ratio Ds to the U-phase duty ratio correction unit 330a. Here, the U-phase basic duty ratio Ds is derived using expression (15) below. Note that the basic duty ratio Ds is constant regardless of phase (i.e., common to the U-phase, V-phase and W-phase), and thus is hereinafter simply referred to as the basic duty ratio Ds if not otherwise specified.

$$Ds=(VH-VL)/VH \quad (15)$$

VH: inverter input voltage (high-potential side voltage)
VL: FC voltage (low-potential side voltage)

The first U-phase duty ratio correction unit (calculation unit) 330a adds the U-phase duty ratio correction Dcrt(u) output from the U-phase PID correction computation unit 310a to the U-phase basic duty ratio Ds output from the U-phase duty ratio input unit 320a, thereby producing an adjusted U-phase duty ratio Dam(u). The first U-phase duty ratio correction unit 330a then outputs the produced adjusted U-phase duty ratio Dam(u) to an interference prevention duty control circuit 340.

Although the above description has been made with the U-phase operation control serving as an example, the same controls are also carried out regarding the V-phase and the W-phase. These controls are briefly described below. A V-phase PID correction computation unit 310b computes a V-phase duty ratio correction Dcrt(v) based on the V-phase current deviation output from the V-phase deviation computation unit 300b under the PID control rule, and then outputs the computed V-phase duty ratio correction Dcrt(v) to a first V-phase duty ratio correction unit 330b. The first V-phase duty ratio correction unit (calculation unit) 330b adds the V-phase duty ratio correction Dcrt(v) output from the V-phase PID correction computation unit 310b to the V-phase basic duty ratio Ds output from the W-phase duty ratio input unit 320b, thereby generating an adjusted V-phase duty ratio Dam(v). The first V-phase duty ratio correction unit 330b outputs the produced adjusted V-phase duty ratio Dam(v) to the interference prevention duty control circuit 340.

Similarly, a W-phase PID correction computation unit 310c computes a W-phase duty ratio correction Dcrt(w) based on the W-phase current deviation output from the W-phase deviation computation unit 300c under the PID control rule, and then outputs the computed W-phase duty ratio correction Dcrt(w) to a first W-phase duty ratio correction unit 330c. The first W-phase duty ratio correction unit (calculation unit) 330c adds the W-phase duty ratio correction Dcrt(w) output from the W-phase PID correction computation unit 310c to the W-phase basic duty ratio Ds output from the W-phase duty ratio input unit 320c, thereby generating an adjusted W-phase duty ratio Dam(w). The first W-phase duty ratio correction unit 330c outputs the produced adjusted W-phase duty ratio Dam(w) to the interference prevention duty control circuit 340.

Interference Prevention Duty Control Circuit 340

The interference prevention duty control circuit 340 includes a duty deviation computation unit 341 and a duty threshold input unit 342.

The duty threshold input unit 342 receives, as an input, the acceptable duty deviation value obtained using expression (10) above. Meanwhile, the duty deviation computation unit (deviation derivation unit) 341 judges whether or not the duty deviation between the phases does not exceed the acceptable duty deviation value Dth by substituting the input adjusted U-phase duty ratio Dam(u), adjusted V-phase duty ratio Dam(v) and adjusted W-phase duty ratio Dam(w) in expressions (12) to (14) above (see expressions (12)' to (14)' below).

$$Dam(v)-Dam(u)<Dth \quad (12)'$$

$$Dam(w)-Dam(v)<Dth \quad (13)'$$

$$Dam(u)-Dam(w)<Dth \quad (14)'$$

When the computation results do not satisfy expressions (12)' to (14)', the duty deviation computation unit 341 performs a correction such that the adjusted U-phase duty ratio Dam(u), the adjusted V-phase duty ratio Dam(v) and the adjusted W-phase duty ratio Dam(w) are corrected under the PID control rule so as to satisfy expressions (12)' to (14)', and outputs the resultant duty ratios as a U-phase interference prevention duty ratio Du, a V-phase interference prevention duty ratio Dv and a W-phase interference prevention duty ratio Dw to an FC converter control circuit 350. On the other hand, when the computation results satisfy expressions (12)' to (14)', the duty deviation computation unit 341 does not correct the adjusted U-phase duty ratio Dam(u), the adjusted V-phase duty ratio Dam(v) and the adjusted W-phase duty ratio Dam(w), and outputs them as the U-phase interference prevention duty ratio Du, the V-phase interference prevention duty ratio Dv and the W-phase interference prevention duty ratio Dw to the FC converter control circuit 350. Note that, if expressions (12)' to (14)' are satisfied, the adjusted U-phase duty ratio Dam(u), the adjusted V-phase duty ratio Dam(v) and the adjusted W-phase duty ratio Dam(w) may be corrected under the PID control rule.

The FC converter control circuit (control unit) 350 controls the operations of the auxiliary circuits 22b by setting the U-phase interference prevention duty ratio Du, the V-phase interference prevention duty ratio Dv and the W-phase interference prevention duty ratio Dw output from the interference prevention duty control circuit 340 as the duty ratios of the second switching elements S2 of the respective phases. The interference prevention duty control described above can prevent the operation interference between the auxiliary circuits 22c of the phases, thereby preventing the occurrence of a circuit failure (element destruction, etc.).

B. Modifications

Although the occurrence of a circuit failure is prevented by preventing the operation interference between the auxiliary circuits 22c of the phases in this embodiment, the occurrence of a circuit failure may be prevented by, for example, setting the maximum acceptable current Imax (see the section of the problem to be solved) of the auxiliary coil L2 constituting the auxiliary circuit 22c to have a value that allows a current for a number of phases to flow.

For example, when the three-phase resonance type FC soft switching converter 250 that includes the U-phase, V-phase and W-phase as in FIG. 2 is employed, the maximum acceptable current Imax of the auxiliary coil L2 (see FIG. 16; lower-limit energization capacitance) is set to be larger than a current for the three phases. As a result, even if the operation interference between the auxiliary circuits 22b is caused for some reason, resulting in the current for the three phases (total current value) flowing to the auxiliary coil L2, this does not lead to the deterioration of the inductance characteristic of the auxiliary coil L2 because the maximum acceptable current Imax of the auxiliary coil L2 has been set to be larger than the current for the three phases. Accordingly, such a configuration also can prevent a problem in that a current equal to or larger than a rated current flows to another circuit element (e.g., the switching element) that constitutes the auxiliary circuit, leading to, in the worst case scenario, destruction of an element.

DESCRIPTION OF SYMBOLS

100, 300: FCHV systems, 110: fuel cell, 120: battery, 130: load, 140: inverter, 2500: FC converter, 160: controller, 170: sensor group, 180: battery converter, 250: FC soft switching converters, 400: gate voltage control circuit, 410: power supply, 420: turn-on control unit, 430: turn-off control unit, 440: drive circuit, 22a: main voltage-increasing circuit, 22b: auxiliary circuit, 22c: free-wheel circuit, S1, S2: switching elements, C1, C3: smoothing capacitors, C2: snubber capacitor, L1, L2: coils, D1, D2, D3, D4, D5: diodes, D6: free-wheel diode

What is claimed is:

1. A converter controller for a multiphase soft switching converter including auxiliary circuits of respective phases, the converter controller controlling an output voltage of a fuel cell, comprising:
    a calculation unit that calculates a duty ratio of an auxiliary switch included in each of the auxiliary circuits of the phases;
    a deviation derivation unit that derives a duty deviation between the auxiliary switches of the phases; and
    a control unit that controls the duty ratio of the auxiliary switch of each phase so that the derived duty deviation does not exceed a preset threshold value, wherein
    the auxiliary circuits of the phases include an auxiliary coil, the auxiliary coil being a common coil shared by the auxiliary circuits of all the phases.

2. The converter controller according to claim 1, wherein:
    a converter of each of the phases includes a main voltage increasing circuit and the auxiliary circuit;
    the main voltage increasing circuit includes:
    a main coil in which one end of the ends is connected to a high-potential-side terminal of the fuel cell;
    a main switch that performs switching and in which: one end of the ends is connected to the other end of the main coil; and the other end is connected to a low-potential-side terminal of the fuel cell;
    a first diode in which a cathode is connected to the other end of the main coil; and
    a smoothing capacitor provided between an anode of the first diode and the other end of the main switch; and
    the auxiliary circuit includes:
    a first series connection including a second diode and a snubber capacitor, the first series connection being connected in parallel with the main switch and being connected to the other end of the main coil and the low-potential-side terminal of the fuel cell; and
    a second series connection including a third diode, the auxiliary switch and the common auxiliary coil, the second series connection being connected between a connecting part between the second diode and the snubber capacitor and the one end of the main coil.

3. The converter controller according to claim 2, wherein:
    the converter of each phase includes a free-wheel diode for keeping, when the auxiliary switch is turned off while the auxiliary coil is being energized, a current flowing in the same direction as that during the energization; and
    the free-wheel diode includes an anode terminal connected to the low-potential-side terminal of the fuel cell and a cathode terminal connected to a connecting part between the auxiliary coil and the auxiliary switch.

4. The converter controller according to claim 1, wherein the preset threshold value is represented by expression (10) below:

$$Dth = \frac{(Tsc/n - Tso)}{Tsc} = 1/n - Tso * f \quad (10)$$

where Dth represents the preset threshold value, f represents a drive frequency of the auxiliary switch, n represents the number of drive phases, and Tso represents an energization time period of the auxiliary coil.

5. The converter controller according to claim 4, wherein the energization time period Tso of the auxiliary coil is represented by expression (11) below:

$$Tso = t\text{mode}1 + t\text{mode}2 \qquad (11)$$
$$= \max\left(Ip - \frac{\Delta I}{2}, 0\right) \times \frac{L2id}{(VH - VL)} + \pi\sqrt{L2id * C2d} +$$
$$\max\left(Ip - \frac{\Delta I}{2}, 0\right) \times \frac{L2id}{VL}.$$

6. A converter controller, for controlling an output voltage of a fuel cell, for a multiphase soft switching controller including auxiliary circuits of respective phases, a control unit that controls the duty ratio of the auxiliary switch of each phase so that the derived duty deviation does not exceed a preset threshold value wherein: the auxiliary circuits of the phases include an auxiliary coil, the auxiliary coil being a common coil shared by the auxiliary circuits of all the phases; and a lower-limit energization capacitance of the auxiliary coil is set to be larger than the total current value of currents that flow for the phases when an auxiliary switch of each of the phases is turned on.

* * * * *